United States Patent [19]
Moloney

[11] 3,915,862
[45] Oct. 28, 1975

[54] SUBMERGED AIR RELEASE DEVICE PARTICULARLY FOR SEWAGE TREATMENT

[75] Inventor: John I. Moloney, Deerfield, Ill.

[73] Assignee: Envirex Inc., Waukesha, Wis.

[22] Filed: June 24, 1974

[21] Appl. No.: 482,356

[52] U.S. Cl. .................. 210/220; 261/122; 261/124
[51] Int. Cl.² ............................................. B05B 1/30
[58] Field of Search .................... 261/122, 124, 123; 210/220, 221; 239/571

[56] References Cited
UNITED STATES PATENTS

| | | |
|---|---|---|
| 3,162,702 | 12/1964 | Yonner ................................ 261/123 |
| 3,424,443 | 1/1969 | Thayer ............................. 210/220 X |
| 3,608,834 | 9/1971 | MacLaren ........................... 239/571 |
| 3,837,629 | 9/1974 | Matras et al. ....................... 261/122 |

*Primary Examiner*—John Adee

[57] ABSTRACT

A molded plastic oblong box having an open bottom and sideward air outlets is attached to the air supply header of an aeration tank for sewage treatment. The outlets are staggered for lateral distribution of the air received from the header. The box is set lengthwise relative to the circulatory flow which the released air maintains in the tank for mixing. This flow extends into and keeps the lower end of the box from becoming clogged and closed.

8 Claims, 6 Drawing Figures

SUBMERGED AIR RELEASE DEVICE PARTICULARLY FOR SEWAGE TREATMENT

BACKGROUND OF THE INVENTION

1. Field of the Invention:

Submerged multiple jet liquid contact devices in Class 261-124.

2. The prior art includes various types of and means for attaching gas diffusing devices at spaced locations to a submerged header which in turn is connected to the gas supply. Several types are commonly in use in the treatment of sewage and while they may be variously classified, their overall utility is measured entirely in terms of their first cost including installation, and their operating cost in terms of their maintenance and the cost of the air supply. (They do not wear out.)

In the treatment of sewage by aeration, the sewage is essentially water but includes nearly all of the lighter suspended solids of the raw sewage and usually also some of the treated solids which have been obtained by settling. The aeration is to supply to the microorganisms the dissolved oxygen which they require for their propagation and their reduction of the dissolved organic content of the sewage. The air is released at a submerged location so that the rate of rise of the air bubbles allows maximum time for the oxygen of the air to pass into solution and also to induce the circulatory motion of the sewage in the tank which effects the distribution of the dissolved oxygen and prevents the suspended solids from settling out on the floor of the tank. In particular, it should be understood here that the sewage herein referred to is "alive" with bacteria and any local quiescent condition within the tank will allow the accretion of a fixed mass of solids at such location. As is well known, this accretion may start with the deposit of a few microscopic particles of organic solids to which the bacteria may be or become attached. They in turn ingest the dissolved organics sweeping past them. As they grow and multiply they provide a larger object to which more organic solids may become attached. This process may continue to whatever extent the flow conditions allow and will result in closing across or clogging any space or opening between fixed structures within the tank.

One type of diffuser commonly used in the treatment of sewage comprises a porous, generally ceramic, plate or tube having many, extremely small orifices. They require a relatively high pressure or head loss at the orifices. They also require frequent cleaning and maintenance. U.S. Pat. No. 3,083,953 shows a porous-plate type of diffuser.

A variable orifice diffuser for the aeration of sewage is shown in U.S. Pat. No. 2,986,382.

Diffusers and spargers which have generally fewer and larger openings of fixed size are also used extensively and several further include a downward "leg" opening. Such "legs" comprise downward extending tubes having a lower opening for the discharge of additional air at only slightly higher pressures and they also provide some equalization of the pressures in the several diffusers or spargers at lower air flow rates. However, these downward "legs" generally comprise tubes or pipes of ¾ or 1 inch diameter and are especially subject to clogging as has been described.

Some spargers have also been claimed to be quickly attachable to the header but require several small parts which are frequently dropped by the assembler and which in service corrode and release themselves and allow the diffuser to become from the header. The present invention provides a diffuser device having the significant unexpected advantages which are set forth hereinafter and none of the above described disadvantages.

SUMMARY OF THE INVENTION

The invention provides a corrosion-resistant, molded or cast diffuser body which is directly attachable to a header provided with a plain round opening for the gas connection therewith. The diffuser body itself or a portion thereof snaps over the round header to secure itself thereto. The header with some number of diffusers attached thereto is located in the tank so that the circulatory motion within the tank keeps the liquid within the lower open "leg" of each diffuser in motion to prevent the liquid contents from accreting therein and closing the same. The diffuser is of a "clean" or entirely plain configuration and may comprise a single, integrally formed or molded structure. The diffuser may be used for diffusing any gas in any liquid but is in particular useful for the aeration of sewage in a sewage treatment plant.

DESCRIPTION OF THE PREFERRED EMBODIMENT

Figure 1:
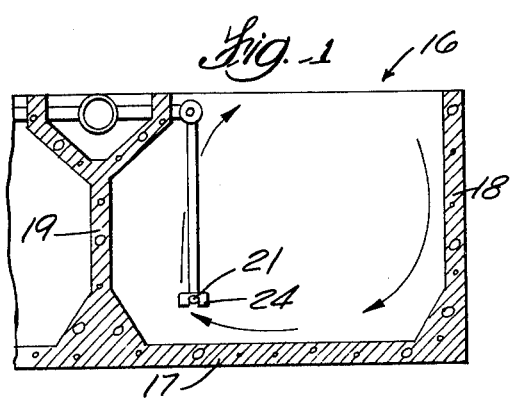
FIG. 1 is a vertical cross-section of a sewage treatment aeration tank and the air supply with a submerged header to which diffusers of the present invention are fitted. One end of the header is shown in elevation.

The drawings show the preferred embodiment as used for the aeration of sewage. The tank 16, shown in part in FIGS. 1 and 2 includes the bottom 17, the side wall 18 and the dividing wall 19 which carries the main air supply line 20. Line 20 is connected by suitable joints and pipes to the lower horizontal headers 21 which extend alongside wall 19. In the particular tank shown the water depth is eighteen feet and the distance from wall 19 to wall 18 is 28 feet.

Header 21 comprises a round pipe of four inches in diameter and is provided with a spaced series of round holes along its upper side. Each hole such as hole 22, see FIG. 3, is approximately 1½ inches in diameter and the header 21 as shown in FIGS. 1-4 is elevated about three feet from the floor or bottom 17 of tank 16.

Each diffuser 24 shown in FIGS. 1-4 comprises the diffuser body 25 and the stem 26. Body 25 is a molded, unitary hollow structure which in side elevation is of an inverted U-shape to fit over the header and the stem 26 is disposed to project into the corresponding hole 22 of the header. The structural parts of diffuser body 25 include the sides 27, the flat top 28, the vertical end walls 29 and the spaced intermediate walls 30 which are joined by the base 31 of the stem 26. The diffuser body as shown is about 2½ inches in width, 18 inches in length, and 12 inches high. The ports 34 in each side 27 of the diffuser are drilled to the size required for tank 16 and use with header 21 and the air flow range which is desired within a selected head loss range, within limits, and as will be described. The ports 34 may also or instead be molded into the diffuser, at nearly no cost, and drilled to larger sizes only as required.

The required thickness of the walls of diffuser 24 depends only on the required structural strength of the diffuser and may be in the order of one-quarter inch. Various materials are available for molding the diffuser. Low-cost moderate strength and good dimensional and chemical stability are required.

The configuration of each of walls 30 of diffuser body 25 is of importance to the invention in that each wall includes the two arcuate upper portions 30a and the two ramp portions 30b. The arcuate portion 30a has a diameter approximately equal to that of the outside of header 21 and the two arcuate portions 30a with the base 31 of stem 26 encompass header 21 as will be further described hereinafter.

In the assembled position as shown, the stem 26 projects downwardly into the hole 22 so that its outer flange 36 presses the sealing ring 37 against the margin of header 21 around hole 22. Ring 37 thus forms a seal which prevents escape of air from header 21 and exteriorly of the stem.

Figure 2:
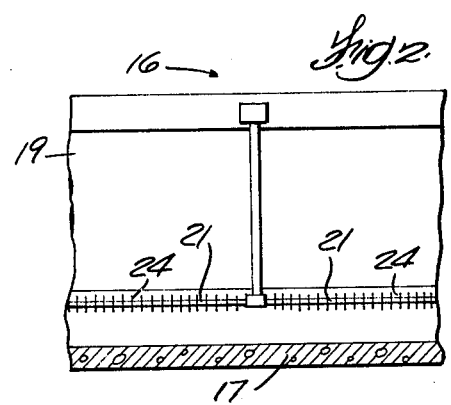
FIG. 2 is a section similar to that of FIG. 1 but shows the header in side elevation and the diffusers in end elevation.
Figure 3:
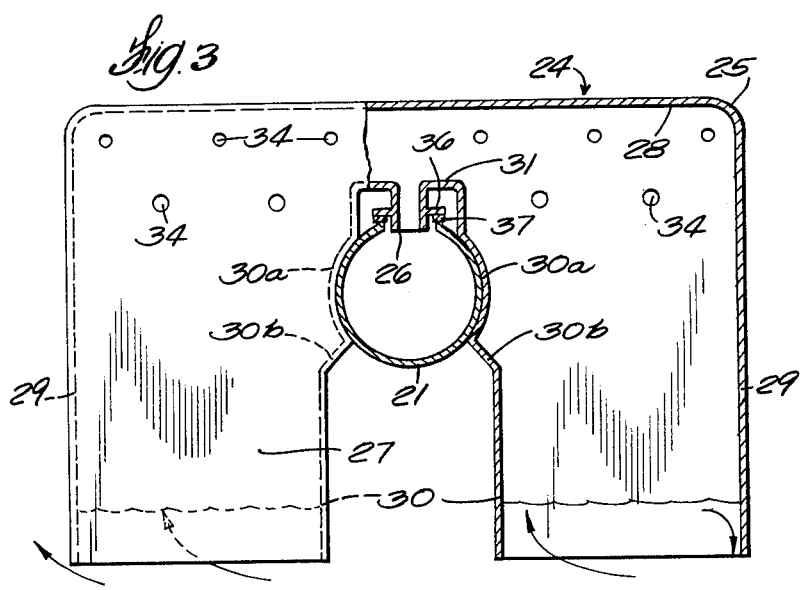
FIG. 3 is an enlarged side view of the diffuser with a portion on one side of the header broken away and sectioned. The header is shown in cross section.
Figure 4:
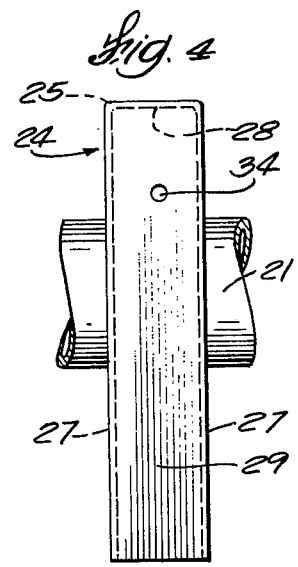
FIG. 4 shows a portion of the header in side elevation and the narrow side of the diffuser which faces the circulatory flow.

As shown in FIG. 2, each header 21 is provided with a number of diffusers 24 which are disposed in relatively close, parallel relation and at the same time elevation or depth within the tank. As shown in FIG. 2, they are approximately 10 inches apart.

In the normal start-up of the aeration system which includes tank 16, sewage may or may not be allowed to enter diffuser body 25 depending upon the type of installation. That is, header 21 may be fixed in the tank or removable with the diffusers attached thereto and with or without provision, not shown, for maintaining air under pressure within the header. In any case, under normal operating conditions the air in diffuser body 25 is maintained at the required pressure as indicated by the head or distance from the surface of the sewage within the tank to that within the diffuser. The level of the sewage within diffuser body 25 as shown in FIG. 3 is approximately 17 feet below the surface shown in FIG. 1 such that the required air pressure in header 21 is approximately 7.5 psi. Further, the average distance from ports 34 to the level within diffuser body 25 is approximately 8½ inches. This distance represents the operating head loss through ports 34 and is an important variable in the operation of the aeration system at various capacities. Such variations are essentially required with changes in the amount and character of the sewage as indicated by the measured increase or decrease in the percent of dissolved free oxygen in the sewage.

In the normal operation of the aeration system which includes tank 16, the air leaves the ports in the form of small bubbles. Upon entering the sewage the bubbles rise nearly vertically and because of their number and proximity, a substantial volume of sewage is entrained and rises therewith to its surface within the tank. The sewage at the surface moves across tank 16 toward wall 18, then downwardly alongside wall 18 and over and across tank bottom 17 toward the headers 21. This circulatory motion is utilized in providing one of the several features or advantages of the present invention in addition to the mixing of the sewage. In particular, the plain vertical sides 27 and ends 29 of diffuser body 25 are such that the upward motion of the sewage has a relatively long, straight upward sweep over sides 27 and ends 29 in approaching ports 34. This "sweep" is particularly effective to break up the streams of air from the ports into more bubbles of smaller size and improve the efficiency of the diffuser. Additionally, this high frequency breaking of the air stream into bubbles is further effective in preventing or significantly delaying the clogging of ports 34.

The location of ports 34 is largely optional. They may all be at one level but their location at two levels such as shown is believed to provide an improved head loss to air flow relationship at intermediate levels. The ports of the upper and lower levels are laterally offset, of course, so that the air bubbles from the ports are well distributed horizontally.

At the operating headloss shown in FIG. 3, the aeration system is operating at near its maximum design rate and the total of twenty ports which are of about ¼ inch in diameter would provide an air flow of in the order of 20 standard cubic feet per minute (SCFM). If conditions require and the pressure in header 21 is increased to over about 7.6 psi., additional air will be discharged from the lower open ends of the diffuser and the air flow rate will well be doubled. It is understood here, of course, that the air is not efficiently discharged but the requirement for such additional air flow capacity is generally of short duration.

Most often, as during night-time and week-end operation, a lower air flow rate is required. A reduction in pressure to 7.3 psi. provides an air flow rate of 10 SCFM. At this rate the lead loss is less than 2 inches and the sewage level in diffuser 24 is only slightly below the lower row of ports 34. Inasmuch as the pressure is adjusted at the blowers supplying the air to the air supply lines of the plant, the slightly different actual pressures in the headers of the several aeration tanks of the plant would ordinarily be significant in that more air would be discharged through some ports and none through some others. The open bottom of diffusers 24 here provides an equalization of the pressure in all of the diffusers to assure the uniform distribution of the air in the aeration tanks.

In the embodiment of the invention shown in FIGS. 1–4 the open bottom referred to, corresponds in However, with two downward open legs. however, from the typical dimensions of diffuser body 25 which have been given above, it will be seen that these legs are especially large and open. Their longer dimension is in the order of 6 inches and is also uniquely disposed in line with the circulatory flow of the sewage in tank 16. According to the invention this relationship is unique in that this flow very effectively extends into both lower legs and may be said to prevent absolutely any clogging or closing no matter how long the diffusers may remain in uninterrupted service.

It has been mentioned that ports 34 may be readily drilled to a larger size or more ports may be provided of the same size. This is expedient is available for example if the higher air flow rate is desired from each diffuser. For example, a selected increase in the size of the ports could provide an air flow range of between 20 and 40 SCFM with a corresponding headloss range of 2 to 9 inches. The size of the ports will, of course, be determined according to the design capacity of the aeration tank. Also, frequently the sewage treatment plant may be expanded such that the design capacity of existing aeration tanks are to be increased. The ports of diffusers 24 may be readily drilled to larger sizes.

Whether new diffusers are to be installed or the diffusers are to be removed for any reason and replaced, their direct, quick and easy attachment and removal from the header, involving no additional parts other than seal ring 37, is an important factor in their overall utility.

The attachment and securement of the diffuser to header 21 is provided for by the ramp portions 30b which diverge downwardly. As shown, walls 30 below portions 30b are spaced so that the diffuser may be lowered over header 21 with stem 26 directly over hole 22. Seal 37 may then be put into place either on the stem or on the header. A quick firm downward blow as with a rubber mallet is then all that is needed to push the diffuser downwardly and into place on the header as already described. In the assembly step, the diffuser body 25 is of course elastically deformed as the header spreads the ramp portions to pass over the widest part of the header which is at the level of its centerline. The arcuate wall portions 30a immediately above ramp portions 30b extend to a level below the centerline referred to so that the resilience of the diffuser body itself uniquely functions to hold the diffuser in place on the header. The lower end of stem 26 extending into hole 22 eliminates any possibility that the diffuser might turn about the header and become tilted. The modulus of elasticity required for such assembly is uniquely nominal because of the relatively ample dimensions of diffuser body 25 in the directions of stress and the relatively smaller thereto, normal therto. While the low modulus means that a fairly hard blow is required to assemble the diffuser on the header, it also provides a corresponding tight or firm grip on the header. Any variations in the diameter of the header within manufacturing tolerances are, of course, readily accomodated as well.

The removal of a diffuser from the header is effected in the reverse manner. Almost any material suitable for the construction of the diffuser will have the relatively modest elasticity required for this unique feature.

Figure 5:
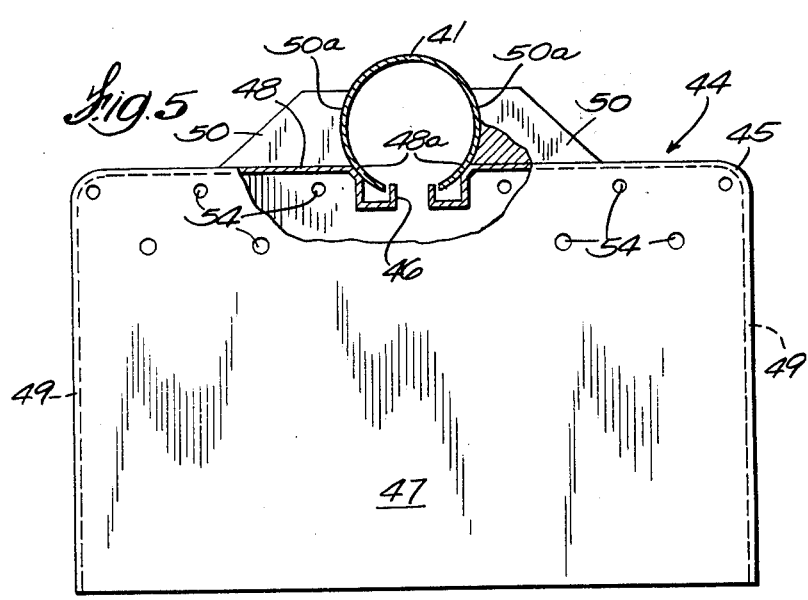
FIG. 5 is a view similar to FIG. 3 and shows an alternate embodiment of the invention.
Figure 6:
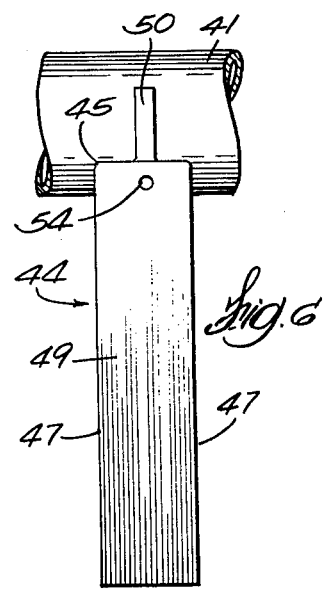
FIG. 6 is a view similar to FIG. 4 and shows the alternate embodiment of the invention of FIG. 5.

The embodiment of the invention shown in FIGS. 5 and 6 is mounted on the header 41 which is provided with a lower round hole 42 and would have to be located, for example, in tank 16 in the order of six inches higher than header 21. The diffuser 44 as shown comprises the diffuser body 45 and the upward stem 46. Body 45 is similarly in the form of a rectangular box with a lower open end and comprises the vertical sides 47, top 48 and vertical ends 49. The diffuser body 45 and upper stem 46 are of molded integral construction and the two braces 50 or buttresses are also integrally molded therewith. In the assembled position the stem 46 extends upward into the lower round hole 42 of header 41 and the header fits snugly between the arcuate sides 50a of braces 50 and engages the adjoining arcuate portions 48a of the top 48 of the diffuser body. Stem 46 fits within the hole 42 and any type of seal may be provided. Optionally, no seal may be required if the loss of air is nominal. It may be noted that the lower row of ports 54 are at the elevation of the "leak" such that it may be considered a part of the diffuser output and in any event will be of a temporary duration anyway. The upper row of ports 54 preferably open, as shown, from the two upper chamber portions of the diffuser body.

The entire lower end of diffuser 44 is open and the sewage which may extend to any level within the diffuser body is particularly kept in motion by the circulatory motion of the sewage in the tank as has been described.

The upward sweep of the sewage over sides 47 is possibly more effective in breaking up the air from ports 54 into small bubbles because of the location of header 41 above the diffuser. The diffuser is similarly readily snapped-on and removed from header 41. A slight further advantage is provided by the bouyant effect of the diffuser body 45 in that it tends to hold the diffuser in place against the underside of the header.

With reference to both embodiments of the invention, the diffuser may be readily manufactured by molding and such that its width may be selected in accordance with the nature of the waste being aerated in tank 16. That is, if the sewage is an ordinary municipal waste, the diffuser body 25 might be of the length and height described but the chamber could possibly be as narrow as one inch because such sewage has somewhat less tendency to clog. On the other hand, a meat packing waste is especially laden with organics which can collect on and bridge across remarkably widely spaced surfaces. In that case, the chamber of diffuser body 25 would best be up to four inches wide to prevent such clogging.

The position of the diffuser 24 or of diffuser 44 with respect to the bottom 17 of tank 16 is of importance to the invention. Generally, diffusers of whatever type are placed above the tank floor so that they are above whatever long-term accumulation of grit is anticipated. This means they may be as near as 6 inches from the floor, where practically no grit accumulation is expected and as high as 2 feet from the tank floor where an appreciable accumulation may be expected. It should be understood that the diffuser cannot be at one-half of the water depth, for example, because the circulatory motion would not properly keep the chamber from clogging.

I claim:

1. In combination with a tank for the aeration of sewage, a submerged horizontal air supply header for the discharge of air from spaced orificies arranged in a general line within the tank such that the rising air bubbles induce a general rolling motion of the sewage which sweeps across the floor of the tank toward the header, and a plurality of air diffuser devices attached to the header and communicating therewith through corresponding openings in the wall of the header; the improvement wherein each diffuser comprises a box-like structure including a top, side and end walls forming a chamber which opens downwardly and having a number of orifices near its top, said orifices being the spaced orifices referred to, in normal operation the lower portion of the chamber being partially filled with sewage up to the hydrostatic pressure level of the air supply but below such orifices, the entire lower end of the diffuser at least on each side of the header being open and of substantial horizontal length normal to the header and near the floor of the tank such that the sweep of the sewage toward the header extends to the air-sewage interface in the diffuser chamber and prevents the accumulation of biological slime therein.

2. In combination with a header adapted to be disposed in a tank for the aeration of sewage therein and so that the discharge of air from spaced orifices are arranged such that the rising air bubbles induce a general rolling motion of the sewage which sweeps across the floor of the tank toward the header, a plurality of air diffuser devices attached to the header and communicating therewith through corresponding openings in the wall of the header; each diffuser comprising a box-like structure including a top, side and end walls forming a chamber which opens downwardly and having a number of orifices near its top, said orifices being the spaced orifices referred to, in normal operation the lower portion of the chamber being partially filled with sewage up to the hydrostatic pressure level of the air supply but below such orifices, the entire lower end of the diffuser at least on each side of the header being open and of substantial horizontal length normal to the header and near the floor by the tank such that the sweep of the sewage toward the header extends to the air-sewage interface in the diffuser chamber and prevents the accumulation of biological slime therein.

3. An improved air diffuser for attachment to the air supply header of a sewage aeration tank, said diffuser comprising a box-like structure including a top, side and end walls forming a chamber which opens downwardly and having a number of orifices near its top, in normal operation the lower portion of the chamber being partially filled with sewage up to the hydrostatic pressure level of the air supply but below such orifices, the entire lower end of the diffuser at least on each side of the header being open and of substantial horizontal length normal to the header such that with the header located in the tank so that a circulatory motion is provided by the air bubbles discharged therein the sweep of the sewage toward the header extends to the air-sewage interface in the diffuser chamber and prevents the accumulation of biological slime therein.

4. An improved air diffuser adpated to be attached to a round air header pipe for connection to the air supply therein and having a number of orifices for the submerged discharge of diffused air in a tank for the biological treatment of sewage and for keeping the settleable material in suspension by inducing a rolling motion of the sewage, said diffuser being of the type having a downwardly open extension in which the air and sewage have an interface at the hydrostatic pressure level of the air supply, said diffuser being in the form of a hollow box having an upper section including a centrally located short vertical inlet stem adapted to be extended through a vertical opening formed in the pipe and at least one downwardly extending section, said diffuser having a number of air outlets near the upper section, each downward opening section having vertical sides and being of substantial length normal to the header and entirely open at its lower end whereby the rolling motion of the sewage extends into said downward section and prevents the organic material of the sewage from accreting therein.

5. An improved air diffuser adapted to be attached to a round air header pipe for connection to the air supply therein and having a number of orifices for the submerged discharge of diffused air in a tank for the biological treatment of sewage and for keeping the settleable material in suspension by inducing a rolling motion of the sewage, said diffuser being of the type having a downwardly open extension in which the air and sewage have an interface at the hydrostatic pressure level of the air supply, said diffuser being in the form of a hollow box having an upper section including a centrally located short inlet stem adapted to be extended downwardly through an opening formed in the top of the pipe and two downwardly extending sections having circularly shaped sides extending from the stem and adapted to snap over the pipe for its securement thereto, said diffuser having a number of air outlets near the upper section, each downward opening section having vertical sides and being ofo substantial cross-section and entirely open at their lower ends whereby the rolling motion of the sewage extends into said downward sections and prevents the organic material of the sewage from accreting therein.

6. The diffuser of claim 4 which is of integral, molded plastic construction.

7. The diffuser of claim 6 wherein the upper section thereof includes arcuate portions which are adapted to fit over a round header to secure itself thereto and the stem within the header opening prevents its rotational displacement about the header.

8. The diffuser of claim 5 having divergent portions immediate to and below the circularly shaped sides and which are adapted to engage the header and spread the said sides as the header is pushed downwardly into position thereon.

* * * * *